(12) United States Patent
Hong et al.

(10) Patent No.: US 10,711,144 B2
(45) Date of Patent: Jul. 14, 2020

(54) ANTI-SCATTERING FILM AND METHOD FOR MANUFACTURING SAME

(71) Applicant: LG Chem, Ltd., Seoul (KR)

(72) Inventors: Joo-Hee Hong, Gyeonggi-do (KR); Hong-Kwan Cho, Gyeonggi-do (KR); Jang-Soon Kim, Gyeonggi-do (KR)

(73) Assignee: LG Chem, Ltd. (KR)

( * ) Notice: Subject to any disclaimer, the term of this patent is extended or adjusted under 35 U.S.C. 154(b) by 466 days.

(21) Appl. No.: 15/506,557

(22) PCT Filed: Aug. 17, 2015

(86) PCT No.: PCT/KR2015/008563
§ 371 (c)(1),
(2) Date: Feb. 24, 2017

(87) PCT Pub. No.: WO2016/032157
PCT Pub. Date: Mar. 3, 2016

(65) Prior Publication Data
US 2017/0253774 A1    Sep. 7, 2017

(30) Foreign Application Priority Data

Aug. 26, 2014 (KR) .......................... 10-2014-0111462

(51) Int. Cl.
*C09D 7/62* (2018.01)
*B32B 7/02* (2019.01)
(Continued)

(52) U.S. Cl.
CPC .................. *C09D 7/62* (2018.01); *B32B 7/02* (2013.01); *B32B 7/06* (2013.01); *B32B 7/12* (2013.01);
(Continued)

(58) Field of Classification Search
None
See application file for complete search history.

(56) References Cited

U.S. PATENT DOCUMENTS

| | | | |
|---|---|---|---|
| 2010/0165276 A1* | 7/2010 | David | G02B 1/118 349/122 |
| 2010/0173093 A1* | 7/2010 | Radcliffe | B32B 7/02 427/508 |

FOREIGN PATENT DOCUMENTS

| | | | |
|---|---|---|---|
| JP | 2009196286 A | * | 9/2009 |
| JP | 2009196286 A | | 9/2009 |

(Continued)

OTHER PUBLICATIONS

JP 2009-196286 English Machine Translation (Year: 2009).*

(Continued)

*Primary Examiner* — Scott R. Walshon
*Assistant Examiner* — Elaine M Vazquez
(74) *Attorney, Agent, or Firm* — Lerner, David, Littenberg, Krumholz & Mentlik, LLP

(57) ABSTRACT

The present invention relates to an anti-scattering film and a method for manufacturing the same, the anti-scattering film including: a transparent film; and a hard coating layer formed on top of the transparent film, in which the hard coating layer is formed of a composition which includes a UV-curable acrylate resin, first inorganic nanoparticles, second inorganic nanoparticles, a photoinitiator, and a mixed solvent comprising a ketone-based solvent and an alcohol-based solvent, and a plurality of protruding parts is formed on an upper surface of the hard coating layer.

18 Claims, 1 Drawing Sheet

(51) Int. Cl.
  C09J 7/29    (2018.01)
  G02B 1/14    (2015.01)
  B32B 7/06    (2019.01)
  B32B 27/36   (2006.01)
  B32B 27/28   (2006.01)
  B32B 27/08   (2006.01)
  B32B 27/32   (2006.01)
  B32B 7/12    (2006.01)
  C08J 7/04    (2020.01)
  C08K 9/04    (2006.01)
  C09D 4/00    (2006.01)
  G06F 3/041   (2006.01)
  C08K 3/36    (2006.01)

(52) U.S. Cl.
  CPC ............ *B32B 27/08* (2013.01); *B32B 27/285* (2013.01); *B32B 27/286* (2013.01); *B32B 27/32* (2013.01); *B32B 27/36* (2013.01); *B32B 27/365* (2013.01); *C08J 7/0427* (2020.01); *C08K 9/04* (2013.01); *C09D 4/00* (2013.01); *C09J 7/29* (2018.01); *G02B 1/14* (2015.01); *G06F 3/041* (2013.01); *B32B 2250/02* (2013.01); *B32B 2250/244* (2013.01); *B32B 2255/10* (2013.01); *B32B 2255/24* (2013.01); *B32B 2255/26* (2013.01); *B32B 2270/00* (2013.01); *B32B 2307/21* (2013.01); *B32B 2307/306* (2013.01); *B32B 2307/3065* (2013.01); *B32B 2307/412* (2013.01); *B32B 2307/536* (2013.01); *B32B 2307/554* (2013.01); *B32B 2307/748* (2013.01); *B32B 2457/208* (2013.01); *C08J 2333/06* (2013.01); *C08K 3/36* (2013.01); *C08K 2201/011* (2013.01); *C09J 2203/30* (2013.01); *C09J 2205/106* (2013.01); *C09J 2433/006* (2013.01)

(56) References Cited

FOREIGN PATENT DOCUMENTS

| | | |
|---|---|---|
| JP | 2012116157 A | 6/2012 |
| KR | 20100007500 A | 1/2010 |
| KR | 20100073365 A | 7/2010 |
| KR | 20110037622 A | 4/2011 |
| KR | 20110047596 A | 5/2011 |
| KR | 20130021182 A | 3/2013 |
| KR | 20160025121 A | 3/2016 |

OTHER PUBLICATIONS

English Machine Translation of KR-20130021182 (Year: 2013).*
International Search Report from PCT/KR2015/008563, dated Nov. 30, 2015.

* cited by examiner

[Figure 1]
(a)                                                  (b)
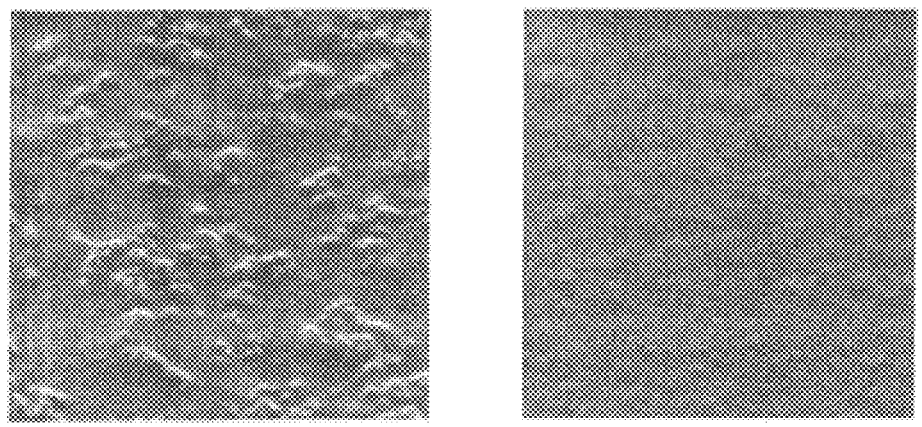
[Figure 2]
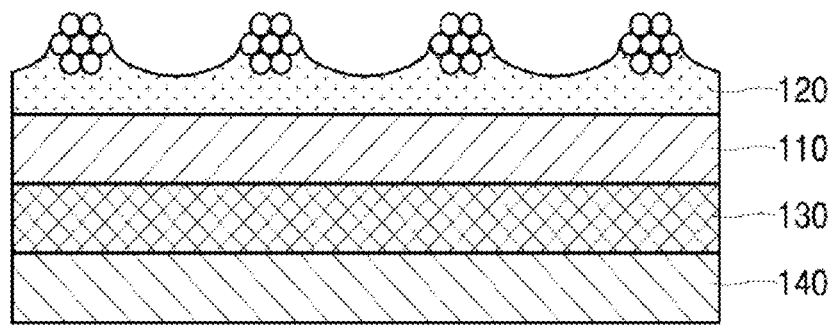

ANTI-SCATTERING FILM AND METHOD FOR MANUFACTURING SAME

CROSS-REFERENCE TO RELATED APPLICATION

This application is a national phase entry under 35 U.S.C. § 371 of International Application No. PCT/KR2015/008563, filed Aug. 17, 2015, which claims priority to Korean Patent Application No. 10-2014-0111462, filed Aug. 26, 2014, the disclosures of which are incorporated herein by reference.

TECHNICAL FIELD

The present invention relates to an anti-scattering film capable of removing a Newton's ring phenomenon and a method for manufacturing same.

BACKGROUND ART

A structure of a touch screen panel to be applied to a mobile phone, and the like has a tendency to be converted from a multi-layered structure in the related art into an integrated structure. The integrated touch screen panel structure stems from the fact that a transparent electrode (ITO) film which has a high cost ratio need not be used.

Through the integrated touch screen panel structure, products can be made slim, and the visible light transmittance may be increased. Despite the advantages, a problem in that a cover glass on a display surface side is broken due to impact from falling and the like frequently occurs.

Accordingly, in order to strengthen the safety against fragments generated during the glass breakage of a mobile device, an anti-scattering film is inserted between a panel and a cover glass, thereby preventing the cover glass from being scattered.

The anti-scattering film generally includes a structure having a hard coating layer/a substrate/an adhesive layer, and requires surface hardness and optical characteristics for the hard coating layer due to the characteristics thereof.

Meanwhile, in the case of a large area touch screen panel, an anti-scattering film touches a polarizing plate due to an air gap between the anti-scattering film and the polarizing plate, and as a result, a Newton's ring phenomenon occurs, the phenomenon occurs due to the interference of light, and accordingly, there is a problem in that visibility deteriorates.

DETAILED DESCRIPTION OF THE INVENTION

Technical Problem

The present invention has been made in an effort to provide an anti-scattering film and a method for manufacturing same, the anti-scattering film including: a transparent film; and a hard coating layer formed on top of the transparent film, in which the hard coating layer is formed of a composition which includes a UV-curable acrylate resin, hydrophobically surface-modified inorganic nanoparticles, a photoinitiator, and a mixed solvent including a ketone-based solvent and an alcohol-based solvent.

However, a technical problem to be achieved by the present invention is not limited to the aforementioned problems, and the other problems that are not mentioned may be clearly understood by the person skilled in the art from the following description.

Technical Solution

The present invention provides an anti-scattering film including: a transparent film; and a hard coating layer formed on top of the transparent film, in which the hard coating layer is formed of a composition which includes a UV-curable acrylate resin, hydrophobically surface-modified inorganic nanoparticles, a photoinitiator, and a mixed solvent including a ketone-based solvent and an alcohol-based solvent.

The surface-modified inorganic nanoparticles aggregate with each other to form surface-modified inorganic nanoparticle clusters, and only a portion of the surface-modified inorganic nanoparticle clusters are buried in the composition, so that portions which are not buried are exposed to form a plurality of protruding parts on an upper surface of the hard coating layer.

The surface-modified inorganic nanoparticle clusters may have a size of 500 nm to 5 µm.

The number of the plurality of protruding parts may be 50 to 300 ea. per 10 cm$^2$ of the upper surface of the hard coating layer.

The plurality of protruding parts may have an average height of 100 nm to 300 nm.

An alkyl group having 8 to 12 carbon atoms may be introduced into outer surfaces of the surface-modified inorganic nanoparticles.

The mixed solvent may have a polarity index of 3 to 5.

The mixed solvent may further include one or more other solvents selected from the group consisting of an amide-based solvent, a hydrocarbon-based solvent, an ester-based solvent, an ether-based solvent, and a glycol-based solvent.

The mixed solvent may include 60 to 80 wt % of a ketone-based solvent, 15 to 35 wt % of an alcohol-based solvent, and 5 to 10 wt % of the other solvents.

The composition may further include inorganic nanoparticles which are not surface-modified.

The inorganic nanoparticles which are not surface-modified may not form protruding parts on the upper surface of the hard coating layer in a state of being completely buried in the composition.

The UV-curable acrylate resin, the surface-modified inorganic nanoparticles, and the photoinitiator may be included in an amount of 10 to 70 parts by weight, 1 to 30 parts by weight, and 1 to 15 parts by weight, respectively, based on a total 100 parts by weight of the composition.

The composition may form a network structure by the surface-modified inorganic nanoparticles.

The hard coating layer may have a thickness of 0.1 µm to 10 µm.

The hard coating layer may have a pencil hardness of 1H to 9H.

The hard coating layer may have a transmittance of 90% to 100%.

The anti-scattering film may further include an adhesive layer formed on bottom of the transparent film.

The anti-scattering film may further include a release film formed on bottom of the adhesive layer.

An exemplary embodiment of the present invention provides a method for manufacturing an anti-scattering film, the method including: (a) preparing a composition which includes a UV-curable acrylate resin, hydrophobically surface-modified inorganic nanoparticles, a photoinitiator, and a mixed solvent including a ketone-based solvent and an alcohol-based solvent; and (b) forming a hard coating layer by coating an upper surface of the transparent film with the composition.

In Step (b), the surface-modified inorganic nanoparticles may aggregate with each other in the coated composition to form surface-modified inorganic nanoparticle clusters, and the surface-modified inorganic nanoparticle clusters may rise to form a plurality of protruding parts on an upper surface of the hard coating layer.

Advantageous Effects

An anti-scattering film according to the present invention includes a hard coating layer formed of a composition which forms a network structure by inorganic nanoparticles due to a mixed solvent, and as a result, the anti-scattering film is excellent in surface hardness and optical characteristics even though the hard coating layer has a small thickness.

Further, since surface-modified inorganic nanoparticle clusters rise in the coated composition to form a plurality of protruding parts on an upper surface of a hard coating layer, a Newton's ring phenomenon may be effectively removed.

BRIEF DESCRIPTION OF DRAWINGS

FIG. 1 is an FE-SEM (HITACHI, SU-8010) photograph illustrating a comparison between an upper surface (an angle at 45° of a hard coating layer on which a plurality of protruding parts is formed in an anti-scattering film according to Example 1 of the present invention and an upper surface of a hard coating layer of an anti-scattering film according to Comparative Example 2.

FIG. 2 is a cross-sectional view schematically illustrating an anti-scattering film according to an exemplary embodiment of the present invention.

BEST MODE

Hereinafter, exemplary embodiments of the present invention will be described in detail with reference to the accompanying drawings so that a person with ordinary skill in the art to which the present invention pertains can easily carry out the present invention. The present invention can be implemented in various different forms, and is not limited to the exemplary embodiments described herein.

To clearly describe the present invention, parts irrespective of the description are omitted, and the same reference numerals will be given to the same or similar constituent elements throughout the specification.

In the drawings, the thicknesses of several layers and regions are enlarged so as to clearly express the layers and regions. Moreover, in the drawings, the thicknesses of some layers and regions are exaggerated for convenience of explanation.

Hereinafter, formation of any configuration "on top (or bottom) of a substrate means that any configuration is formed while being brought into contact with an upper surface (or a lower surface) of the substrate, and is not limited to exclude other configurations between the substrate and any configuration formed on top (or bottom) of the substrate.

Anti-Scattering Film and Method for Manufacturing the Same

The present invention provides an anti-scattering film including: a transparent film; and a hard coating layer formed on top of the transparent film, in which the hard coating layer is formed of a composition which includes a UV-curable acrylate resin, hydrophobically surface-modified inorganic nanoparticles, a photoinitiator, and a mixed solvent including a ketone-based solvent and an alcohol-based solvent.

The surface-modified inorganic nanoparticles may aggregate with each other to form surface-modified inorganic nanoparticle clusters, and only a portion of the surface-modified inorganic nanoparticle clusters may be buried in the composition, so that portions which are not buried are exposed to form a plurality of protruding parts on an upper surface of the hard coating layer.

Further, the present invention provides a method for manufacturing an anti-scattering film, the method including: (a) preparing a composition which includes a UV-curable acrylate resin, hydrophobically surface-modified inorganic nanoparticles, a photoinitiator, and a mixed solvent including a ketone-based solvent and an alcohol-based solvent; and (b) forming a hard coating layer by coating an upper surface of the transparent film with the composition.

In Step (b), the surface-modified inorganic nanoparticles may aggregate with each other in the coated composition) to form surface-modified inorganic nanoparticle clusters, and the surface-modified inorganic nanoparticle clusters may rise to form a plurality of protruding parts on an upper surface of the hard coating layer.

FIG. 2 is a cross-sectional view schematically illustrating an anti-scattering film according to an exemplary embodiment of the present invention.

Referring to FIG. 2, an anti-scattering film according to an exemplary embodiment of the present invention includes a hard coating layer 120 and a transparent film 110, which are formed from the above, and may further include an adhesive layer 130 and a release film 140, which are sequentially formed on bottom of the transparent film 110. A plurality of protruding parts may be formed on an upper surface of the hard coating layer 120.

The transparent film 110 may be a film which has excellent strength so as to be capable of preventing glass of a touch screen panel, such as tempered glass, from being scattered, and also has excellent transparency in which the transmittance is at least 90% or more, preferably 90 to 100%, so as not to suppress optical characteristics.

As the transparent film 110, it is preferred to use one or more selected from the group consisting of polyethylene terephthalate (PET), polyethylene naphthalate (PEN), polyethersulfone (PES), polycarbonate (PC), polyethylene (PE), polypropylene (PP) or a combination thereof, and it is more preferred to use an optical PET film having a visible light transmittance of 92%, but the transparent film 110 is not limited thereto.

The hard coating layer 120 is formed on top of the transparent film 110, and is formed of a composition which includes a UV-curable acrylate resin, hydrophobically surface-modified inorganic nanoparticles, a photoinitiator, and a mixed solvent including a ketone-based solvent and an alcohol-based solvent.

In this case, the hard coating layer 120 is formed of a composition which forms a network structure by inorganic nanoparticles due to a mixed solvent, and has excellent surface hardness and optical characteristics even though the hard coating layer 120 has a small thickness.

Further, the surface-modified inorganic nanoparticles aggregate with each other to form surface-modified inorganic nanoparticle clusters, the surface-modified inorganic nanoparticle clusters rise, and only a portion of the surface-modified inorganic nanoparticle clusters are buried in the composition, so that portions which are not buried are exposed to form a plurality of protruding parts on an upper surface of the hard coating layer 120, and as a result, a Newton's ring phenomenon may be effectively removed.

Specifically, a majority of the surface-modified inorganic nanoparticles aggregate with each other to form surface-modified inorganic nanoparticle clusters, and only a portion of the surface-modified inorganic nanoparticle clusters are buried in the composition, so that portions which are not buried are exposed to form a plurality of protruding parts. Although not illustrated in a drawing, several surface-modified inorganic nanoparticles aggregate with each other to form surface-modified inorganic nanoparticle clusters, and thus may also be completely buried in the composition without forming a plurality of protruding parts, and several surface-modified inorganic nanoparticles fail to form surface-modified inorganic nanoparticle clusters and may also be completely buried individually in the composition without forming a plurality of protruding parts.

Hereinafter, the composition will be described in detail.

The composition is for forming the hard coating layer 120 of an anti-scattering film, and includes a UV-curable acrylate resin, hydrophobically surface-modified inorganic nanoparticles, a photoinitiator, and a mixed solvent including a ketone-based solvent and an alcohol-based solvent.

The UV-curable acrylate resin includes at least two or more, preferably 2 to 15 functional groups, thereby contributing to improvement in hardness and prevention of curls. In this case, when the number of functional groups included in the UV-curable acrylate resin is less than 2, the addition effect thereof may be insufficient, and in contrast, when the number of functional groups is more than 15, curls may occur. In this case, the UV-curable acrylate resin has high surface energy, and thus may allow the surface-modified inorganic nanoparticles in the composition to effectively rise.

In addition, the UV-curable acrylate resin may be added in an amount of 10 to 70 parts by weight based on a total 100 parts by weight of the composition. In this case, when the UV-curable acrylate resin is included in an amount of less than 10 parts by weight, the addition effect thereof may be insufficient, and when the UV-curable acrylate resin is included in an amount of more than 70 parts by weight, the functionality of a coating solution may not be imparted.

The hydrophobically surface-modified inorganic nanoparticles refer to nanoparticles in which some surfaces of inorganic nanoparticles are hydrophobically modified, and only some surfaces of the inorganic nanoparticles may be hydrophobically modified, and the other surfaces of the inorganic nanoparticles may have hydrophilicity as they are.

The inorganic nanoparticles mean nano-sized inorganic nanoparticles, and are for securing hardness and curls. The inorganic nanoparticles may be one or more selected from the group consisting of silica, alumina, zirconia, zeolite, titanium oxide, and a combination thereof, and are more preferably silica in terms of performance and costs among them, but are not limited thereto.

For the surface-modified inorganic nanoparticles, an alkyl group having 8 to 12 carbon atoms may be introduced into the surfaces of the particles, and as a result, a relatively high level of hydrophobic properties may be imparted to the surface-modified inorganic nanoparticles by sufficiently lowering the surface energy, and accordingly, the surface-modified inorganic nanoparticles may effectively rise in the composition to easily form protruding parts, thereby effectively removing a Newton's ring phenomenon.

For example, the alkyl group having 8 to 12 carbon atoms may be introduced by chemically reacting silica particles with a silane compound including the alkyl group having 8 to 12 carbon atoms. The silane compound may be linked to the surfaces of the silica particles by a siloxane bond via a hydrolysis reaction, a condensation reaction, and the like, but the linking method is not limited thereto.

The silane compound may include at least one selected from the group consisting of, for example, methyl trimethoxy silane, methyl triethoxy silane, ethyl trimethoxy silane, ethyl triethoxy silane, n-propyl trimethoxy silane, n-propyl triethoxy silane, isobutyl triethoxy silane, dimethyl dimethoxy silane, dimethyl diethoxy silane, dimethoxy dimethyl silane, and a combination thereof, but is not limited thereto.

Furthermore, the surface-modified inorganic nanoparticles aggregate with each other to form surface-modified inorganic nanoparticle clusters, and only some surfaces of the inorganic nanoparticles are hydrophobically modified and the other surfaces of the inorganic nanoparticles may have hydrophilicity as they are, and as a result, inorganic nanoparticles may aggregate with each other due to hydrogen bonds resulting from the hydrophilicity to form clusters. In this case, the surface-modified inorganic nanoparticle clusters may have a size of 500 nm to 5 µm.

Further, the surface-modified inorganic nanoparticles may be added in an amount of 1 to 30 parts by weight based on a total 100 parts by weight of the composition, and is preferably added in an amount of 1 to 10 parts by weight, but the content is not limited thereto. In this case, when the content of the surface-modified inorganic nanoparticles is less than the aforementioned range, the addition effect thereof may be insufficient, and there is a problem in that when the content of the surface-modified inorganic nanoparticles is more than the aforementioned range, a haze is increased, and as a result, the anti-scattering film may not be used as an optical product.

The composition may further include inorganic nanoparticles which are not surface-modified. The inorganic nanoparticles which are not surface-modified refer to a state where the outer surface is not separately modified, unlike the surface-modified inorganic nanoparticles as described above.

In this case, the inorganic nanoparticles which are not surface-modified may not form protruding parts on an upper surface of the hard coating layer 120 in a state of being completely buried in the composition. Specifically, the silica particles which are not surface-modified in the composition do not rise unlike the surface-modified silica particles, and thus are included by being buried in the Newton's ring prevention film, and do not form the protruding parts.

Further, the inorganic nanoparticles which are not surface-modified are for forming an additional network structure in a composition, and preferably have a size of 5 nm to 20 nm, but the size is not limited thereto. In this case, when the inorganic nanoparticles which are not surface-modified have a size of less than 5 nm, there is a problem in that the content is increased for securing the hardness, and when the inorganic nanoparticles which are not surface-modified have a size of more than 20 nm, there is a problem in that a haze occurs.

In addition, the inorganic nanoparticles which are not surface-modified may be added in an amount of 1 to 30 parts by weight based on a total 100 parts by weight of the composition. In this case, when the inorganic nanoparticles which are not surface-modified are included in an amount of less than 1 part by weight, the addition effect thereof may be insufficient, and when the inorganic nanoparticles which are not surface-modified are included in an amount of more than 30 parts by weight, the functionality of a coating solution may not be imparted.

The photoinitiator serves to be excited by UV rays to initiate photopolymerization. As the photoinitiator, a publicly known photoinitiator may be used, and it is preferred to use one or more selected from the group consisting of benzophenone; substituted benzophenone; acetophenone; substituted acetophenone; benzoin; benzoin alkyl ester; xanthone; substituted xanthone; phosphine oxide; diethoxyacetophenone; benzoin methyl ether; benzoin ethyl ether; benzoin isopropyl ether; diethoxyxanthone; chloro-thioxanthone; N-methyl diethanol-amine-benzophenone; 2-hydroxy-2-methyl-1-phenyl-propan-1-one; 2-benzyl-2-(dimethylamino)-1-[4-(4-morpholinyl)phenyl]-1-butanone; and a combination thereof, but the photoinitiator is not limited thereto.

Further, the photoinitiator may be added in an amount of 1 to 15 parts by weight based on a total 100 parts by weight of the composition. In this case, when the content of the photoinitiator is less than 1 part by weight, there is a problem in that a curing reaction time is prolonged, and when the content of the photoinitiator is more than 15 parts by weight, there is a problem in that an unreacted photoinitiator may remain as an impurity.

The mixed solvent is characterized by including a ketone-based solvent and an alcohol-based solvent. Examples of the ketone-based solvent include methyl ethyl ketone, methyl isobutyl ketone, 1-methyl-2-pyrrolidone, cyclohexanone, or acetone, and the like, and examples of the alcohol-based solvent include propylene glycol monomethyl ether, methanol, ethanol, isopropyl alcohol, or butyl alcohol, and the like.

The mixed solvent may have a polarity index of 3 to 5. In this case, when the mixed solvent has a polarity index of less than 3, there is a problem in that the polarity is so low that the inorganic nanoparticles are completely dispersed, and as a result, a network structure by the inorganic nanoparticles is not formed, and when the mixed solvent has a polarity index of more than 5, there is a problem in that the polarity is too high in that inorganic nanoparticles aggregate with each other without being dispersed.

The mixed solvent may further include one or more other solvents selected from the group consisting of an amide-based solvent, a hydrocarbon-based solvent, an ester-based solvent, an ether-based solvent, and a glycol-based solvent. Examples of the amide-based solvent include N,N-dimethylacetamide, N,N-dimethylformamide, dimethylsulfoxide, N-methylpyrrolidone or formamide, and the like, examples of the hydrocarbon-based solvent include an aliphatic hydrocarbon-based solvent such as hexane or heptane and an aromatic hydrocarbon-based solvent such as anisole, mesitylene or xylene, examples of the ester-based solvent include methyl acetate, ethyl acetate, propyl acetate, methyl propionate, ethyl propionate, γ-butyrolactone, γ-valerolactone, γ-caprolactone, δ-valerolactone or ε-caprolactone, and the like, and examples of the ether-based solvent include tetrahydrofuran, 2-methyl tetrahydrofuran or dibutyl ether, and the like.

When the mixed solvent includes a ketone-based solvent, an alcohol-based solvent, and the other solvents, it is preferred that the mixed solvent includes 60 to 80 wt % of the ketone-based solvent, 15 to 35 wt % of the alcohol-based solvent, and 5 to 10 wt % of the other solvents, but the content is not limited thereto. By maintaining the weight ratio as described above, the mixed solvent may have a predetermined polarity index to induce an appropriate dispersion of first inorganic nanoparticles, thereby forming a network structure in the composition.

As long as the composition may maintain a hard coatability so as to be used as the hard coating layer 120 in an anti-scattering film, an additive may be further added, and it is possible to further add, for example, a dye, a filler, a reinforcing agent, a flame retardant, a plasticizer, a lubricant, a stabilizer (an antioxidant, a UV absorber, a thermal stabilizer, and the like), a release agent, an antistatic agent, a surfactant, a dispersant, a rheology adjustor, a leveling agent, a defoaming agent, a surface modifier, a low stress agent (silicone oil, silicone rubber, various plastic powders, and the like), a heat resistance improving agent, and the like.

The hard coating layer 120 is formed by coating an upper surface of a transparent film with the composition, and examples of a coating method include a spin coating method, a spray coating method, a cast method, a bar coating method, a roll-to-roll coating method, a gravure coating method, a dipping method, and the like. Among these methods, the roll-to-roll coating method is most preferred in terms of productivity, but the coating method is not limited thereto.

The surface-modified inorganic nanoparticles aggregate with each other in the coated composition to form surface-modified inorganic nanoparticle clusters, and the surface-modified inorganic nanoparticle clusters may rise.

Specifically, the surface-modified inorganic nanoparticles may aggregate with each other to form clusters, and a relatively high level of hydrophobic properties may be imparted to the surface-modified inorganic nanoparticles by sufficiently lowering the surface energy due to the hydrophobic surface-modification, and accordingly, the surface-modified inorganic nanoparticle clusters may effectively rise in the coated composition.

Thereafter, the hard coating layer 120 may be formed via a photo-curing process, only a portion of the surface-modified inorganic nanoparticle clusters are buried in the composition via the photo-curing process, so that portions which are not buried are exposed to form a plurality of protruding parts on an upper surface of the hard coating layer, and as a result, the manufacturing process may be simplified by omitting an additional process such as an emboss processing for forming irregularities on the upper surface of the hard coating layer 120, thereby implementing excellent economic efficiency by saving time and costs.

The photo-curing may be, for example, a UV-curing, and the like, and may be typically carried out by using a metal halide lamp, and the like, but is not limited thereto. Further, the UV-curing may be carried out by irradiating, for example, a UV ray of about 100 mJ/cm$^2$ to about 500 mJ/cm$^2$, but is not limited thereto.

The thickness of the hard coating layer 120 may be 0.1 μm to 10 μm, preferably 0.1 μm to 1 μm, more preferably 0.1 μm to 0.8 μm, and even more preferably 0.1 μm to 0.7 μm, but is not limited thereto. Even though the hard coating layer 120 has a small thickness as described above, the hard coating layer 120 may secure surface hardness and optical characteristics due to a network structure by the inorganic nanoparticles due to the mixed solvent. In this case, when the thickness of the hard coating layer 120 is too small, there is a problem with the hard coatability, and when the thickness of the hard coating layer 120 is too large, there is a problem in that costs are increased due to the hard coating.

The hard coating layer 120 may have a pencil hardness of 1H to 9H. The hard coating layer 120 has a pencil hardness within the aforementioned range, thereby implementing excellent abrasion resistance.

In addition, the hard coating layer 120 may have a transmittance of 90% to 100%. The hard coating layer 120 has a transmittance within the aforementioned range to maintain a high level of transparency, thereby implementing excellent optical characteristics.

In order to remove the Newton's ring phenomenon of the anti-scattering film in the related art, irregularities are formed by applying emboss processing and the like to an upper surface of a hard coating layer, but since emboss processing is added, there are problems in that the manufacturing process is complicated and time and costs are greatly consumed.

A plurality of protruding parts may be formed on an upper surface of the hard coating layer 120, and only a portion of the surface-modified inorganic nanoparticle clusters are buried in the composition, so that portions which are not buried are exposed to form the plurality of protruding parts. The surface-modified inorganic nanoparticles in the composition have lower surface energy than that of the composition due to hydrophobic properties, and accordingly, the surface-modified inorganic nanoparticle clusters may effectively rise in the coated composition to form a plurality of protruding parts on the upper surface of the hard coating layer 120. By forming a plurality of protruding parts as described above, surface roughness may be appropriately adjusted without a separate additional process, and as a result, the Newton's ring phenomenon may be removed.

The number of the plurality of protruding parts may be 50 to 300 ea. per 10 cm$^2$ of the upper surface of the hard coating layer 120.

The plurality of protruding parts varies depending on the size of the surface-modified inorganic nanoparticle clusters and the surface energy of the surface-modified inorganic nanoparticles, and may have an average height of 100 nm to 300 nm.

The adhesive layer 130 may be formed on bottom of the transparent film 110, and the adhesive layer 130 may be additionally formed in order to be attached to a touch screen panel, and the like which are a surface to be attached.

Specifically, the adhesive layer 130 may be formed by being directly coated on a lower surface of the transparent film 110, or the adhesive layer 130 may be formed by being coated on an upper surface of the release film 140 in advance, and then laminating the release film 140 with a lower surface of the transparent film 110.

The adhesive layer 130 may use a publicly known adhesive such as an acrylic adhesive, a silicone-based adhesive, and an acid-free type hydroxyl-containing adhesive without limitation. The adhesive layer 130 may include one or more selected from these adhesives. For example, the acid-free type hydroxyl-containing adhesive may include a publicly known photoinitiator such as 2-ethylhexyl acrylate, hydroxyethyl acrylate, and benzophenone, and may further include an additive. The additive is for improving physical properties of the adhesive, and a curing accelerator, a plasticizer, a dispersant, a surfactant, an antistatic agent, a defoaming agent, and a leveling agent, which are publicly known, may be used without limitation.

The release film 140 may be formed on bottom of the adhesive layer 130, and is for protecting the adhesive layer 130.

As the release film 140, various films such as polyethylene terephthalate (PET) film may be used, and in order to be capable of carrying out a release, it is preferred to use a release PET film having a release force of approximately 10 g/in, but the release film 140 is not limited thereto.

Hereinafter, preferred Examples for helping the understanding of the present invention will be suggested. However, the following Examples are provided only to more easily understand the present invention, and the contents of the present invention are not limited by the following Examples.

EXAMPLES

Example 1

A mixed solvent including 50 parts by weight of methyl ethyl ketone (MEK) as a ketone-based solvent, 45 parts by weight of propylene glycol monomethyl ether (PGME) as an alcohol-based solvent, and 5 parts by weight of N,N-dimethylacetamide as an amide-based solvent was prepared. A composition forming a network structure was prepared by including the mixed solvent prepared, and 30 parts by weight of a UV-curable acrylate resin, 5 parts by weight of silica (CIK, AB-S series) hydrophobically surface-modified by introducing an alkyl group having 10 carbon atoms into the surfaces of particles having a size of about 50 nm, and 10 parts by weight of benzophenone, based on a total 100 parts by weight of the composition. The prepared composition was coated on top of a PET transparent film via a roll-to-roll coating. Surface-modified silicas aggregated with each other in the coated composition to form surface-modified silica clusters, and the surface-modified silica clusters rose. Thereafter, a hard coating layer having a thickness of about 2 μm was prepared by drying and UV-curing, and only a portion of the surface-modified silica clusters were buried in the composition, so that portions, which were not buried, are exposed to an upper surface of the hard coating layer to form a plurality of protruding parts having a size of about 200 nm on the upper surface of the hard coating layer, thereby manufacturing an anti-scattering film (see FIG. 1(a)). In this case, the number of the plurality of protruding parts was about 200 ea. per 10 cm$^2$ of the upper surface of the hard coating layer.

Example 2

An anti-scattering film was manufactured in the same manner as in Example 1, except that the composition further included 10 parts by weight of silica having a size of about 10 nm, which was not surface-modified.

Comparative Example 1

An anti-scattering film was manufactured in the same manner as in Example 1, except that methyl isobutyl ketone (MIBK) was used alone as the ketone-based solvent instead of the mixed solvent.

Comparative Example 2

An anti-scattering film was manufactured in the same manner as in Example 1, except that only silica, which was not surface-modified, was included instead of the surface-modified silica (see FIG. 1(b)).

Experimental Example: Evaluation of Physical Properties

The results of measuring the pencil hardness of the anti-scattering films manufactured according to Examples 1 and 2 and Comparative Examples 1 and 2, measuring the visible light transmittances thereof, and observing the Newton's ring phenomenon are shown in the following Table 1.

The pencil hardness was measured by using a load of 750 g in accordance with JIS K5600-5-4, the visible light transmittance was measured by using a spectrophotometer (manufactured by Konica Minolta, Inc., CM-5) in accordance with JIS K7361-1, and the Newton's ring phenomenon was observed by the unaided eye by vigorously rubbing the anti-scattering films by means of a 1 kg roller (those in which no Newton's ring phenomenon occurred are marked with ⊚, those in which the Newton's ring phenomenon minutely occurred are marked with ○, those in which the Newton's ring phenomenon slightly occurred are marked with Δ, and those in which a plurality of the Newton's ring phenomena occurred are marked with ×).

TABLE 1

| Classification | Pencil hardness | Visible light transmittance | Newton's ring phenomenon |
|---|---|---|---|
| Example 1 | 2H | 92 | ⊚ |
| Example 2 | 2H | 91 | ⊚ |
| Comparative Example 1 | H | 92 | ⊚ |
| Comparative Example 2 | H | 92 | X |

As shown in Table 1, it could be confirmed that the anti-scattering films according to Examples 1 and 2 included a hard coating layer formed of a composition which formed a network structure by silica due to a mixed solvent, and thus had excellent pencil hardness and visible light transmittance even though the hard coating layer had a small thickness. Further, it could be confirmed that silica rose to form a plurality of protruding parts on an upper surface of a hard coating layer, and as a result, the Newton's ring phenomenon could be effectively removed.

Meanwhile, it could be confirmed that the anti-scattering film according to Comparative Example 1 had a problem in that the pencil hardness deteriorated because the composition failed to form a network structure by the surface-modified silica, and it could be confirmed that the anti-scattering film according to Comparative Example 2 included only silica, which was not surface-modified, in the composition, and thus failed to form protruding parts on an upper surface of the hard coating layer, and as a result, there was a problem in that the Newton's ring phenomenon occurred.

The above-described description of the present invention is provided for illustrative purposes, and the person skilled in the art to which the present invention pertains will understand that the present invention can be easily modified into other specific forms without changing the technical spirit or essential features of the present invention. Therefore, it should be understood that the above-described Examples are illustrative only in all aspects and are not restrictive.

EXPLANATION OF REFERENCE NUMERALS AND SYMBOLS

110: Transparent film
120: Hard coating layer
130: Adhesive layer
140: Release film

The invention claimed is:

1. An anti-scattering film comprising:
a transparent film; and
a hard coating layer formed on top of the transparent film,
wherein the hard coating layer is formed of a composition which comprises a UV-curable acrylate resin, hydrophobically surface-modified inorganic nanoparticles, a photoinitiator, and a mixed solvent comprising a ketone-based solvent and an alcohol-based solvent,
wherein the surface-modified inorganic nanoparticles aggregate with each other to form surface-modified inorganic nanoparticle clusters, and only a portion of the surface-modified inorganic nanoparticle clusters are buried in the composition, so that portions which are not buried are exposed to form a plurality of protruding parts on an upper surface of the hard coating layer, and
wherein an alkyl group having 9, 11 or 12 carbon atoms is introduced into outer surfaces of the surface-modified inorganic nanoparticles.

2. The anti-scattering film of claim 1, wherein the surface-modified inorganic nanoparticle clusters have a size of 500 nm to 5 μm.

3. The anti-scattering film of claim 1, wherein the number of the plurality of protruding parts is 50 to 300 ea. per 10 cm$^2$ of the upper surface of the hard coating layer.

4. The anti-scattering film of claim 1, wherein the plurality of protruding parts has an average height of 100 nm to 300 nm.

5. The anti-scattering film of claim 1, wherein the mixed solvent has a polarity index of 3 to 5.

6. The anti-scattering film of claim 1, wherein the mixed solvent further comprises one or more other solvents selected from the group consisting of an amide-based solvent, a hydrocarbon-based solvent, an ester-based solvent, an ether-based solvent, and a glycol-based solvent.

7. The anti-scattering film of claim 6, wherein the mixed solvent comprises 60 to 80 wt % of a ketone-based solvent, 15 to 35 wt % of an alcohol-based solvent, and 5 to 10 wt % of the other solvents.

8. The anti-scattering film of claim 1, wherein the composition further comprises inorganic nanoparticles which are not surface-modified.

9. The anti-scattering film of claim 8, wherein the inorganic nanoparticles which are not surface-modified do not form protruding parts on the upper surface of the hard coating layer in a state of being completely buried in the composition.

10. The anti-scattering film of claim 1, wherein the UV-curable acrylate resin, the surface-modified inorganic nanoparticles, and the photoinitiator are comprised in an amount of 10 to 70 parts by weight, 1 to 30 parts by weight, and 1 to 15 parts by weight, respectively, based on a total 100 parts by weight of the composition.

11. The anti-scattering film of claim 1, wherein the composition forms a network structure by the surface-modified inorganic nanoparticles.

12. The anti-scattering film of claim 1, wherein the hard coating layer has a thickness of 0.1 μm to 10 μm.

13. The anti-scattering film of claim 1, wherein the hard coating layer has a pencil hardness of 1H to 9H.

14. The anti-scattering film of claim 1, wherein the hard coating layer has a transmittance of 90% to 100%.

15. The anti-scattering film of claim 1, further comprising:
an adhesive layer formed on bottom of the transparent film.

16. The anti-scattering film of claim 15, further comprising:
a release film formed on bottom of the adhesive layer.

17. A method for manufacturing the anti-scattering film of claim 1, the method comprising:
   (a) preparing a composition which comprises a UV-curable acrylate resin, hydrophobically surface-modified inorganic nanoparticles, a photoinitiator, and a mixed solvent comprising a ketone-based solvent and an alcohol-based solvent; and
   (b) forming a hard coating layer by coating an upper surface of the transparent film with the composition.

18. The method of claim 17, wherein in Step (b), the surface-modified inorganic nanoparticles aggregate with each other in the coated composition to form surface-modified inorganic nanoparticle clusters, and the surface-modified inorganic nanoparticle clusters rise to form a plurality of protruding parts on an upper surface of the hard coating layer.

* * * * *